(12) United States Patent
Hobbs

(10) Patent No.: US 7,499,943 B2
(45) Date of Patent: Mar. 3, 2009

(54) MAPPING FOR MAPPING SOURCE AND TARGET OBJECTS

(75) Inventor: Robert La Verne Hobbs, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 11/328,798

(22) Filed: Jan. 9, 2006

(65) Prior Publication Data

US 2007/0162489 A1    Jul. 12, 2007

(51) Int. Cl.
   *G06F 7/00* (2006.01)
(52) U.S. Cl. .................................... 707/102; 707/104.1
(58) Field of Classification Search ......... 707/100–102, 707/104.1
   See application file for complete search history.

(56) References Cited

U.S. PATENT DOCUMENTS

| | | | | |
|---|---|---|---|---|
| 6,108,597 | A * | 8/2000 | Kirchner et al. ............... | 701/23 |
| 6,564,368 | B1 | 5/2003 | Beckett et al. | |
| 6,714,926 | B1 * | 3/2004 | Benson ........................... | 707/2 |
| 6,718,072 | B1 * | 4/2004 | Sekiya et al. ................... | 382/298 |
| 6,795,825 | B2 * | 9/2004 | Rishe ............................. | 707/10 |
| 6,901,171 | B1 * | 5/2005 | Dutta-Choudhury et al. ..... | 382/266 |
| 7,139,977 | B1 * | 11/2006 | Russell ......................... | 715/234 |
| 7,148,824 | B1 * | 12/2006 | Porter et al. ................... | 341/90 |
| 2003/0217069 | A1 * | 11/2003 | Fagin et al. .................. | 707/102 |
| 2003/0229645 | A1 * | 12/2003 | Mogi et al. ................... | 707/102 |
| 2005/0015732 | A1 | 1/2005 | Vedula et al. | |
| 2005/0055369 | A1 | 3/2005 | Gorelik et al. | |
| 2006/0020602 | A9 * | 1/2006 | Morgan et al. ................ | 707/100 |
| 2007/0061363 | A1 * | 3/2007 | Ramer et al. ................. | 707/104.1 |

OTHER PUBLICATIONS

IBM Corporation, "Mapping XML Schemas- Demo", [online], [Retrieved on Aug. 26, 2005], retrieved from the Internet at <URL: http://www.almaden.ibm.com/cs/clio/xmlDemo{P1; P2; P3; P4}.html>.
Altova, "Altova MapForce 2005", [online], 2005, [Retrieved on Jun. 8, 2005], retrieved from the Internet at <URL: http:// www.altova.com/products_mapforce.html>, 4 pages.
Altova, "Altova MapForce 2006", [online], 2006, [Retrieved on Jan. 5, 2006], retrieved from the Internet at <URL: http:// www.altova.com/products_mapforce.html>, 4 pages.
U.S. Appl. No. 09/658,303, entitled "System and Method for Schema Mapping Background of the Invention", filed Sep. 8, 2000, invented by L. Hass, 31 pages.

* cited by examiner

*Primary Examiner*—Don Wong
*Assistant Examiner*—Linh Black
(74) *Attorney, Agent, or Firm*—Janaki K. Davda; Konrad Raynes & Victor LLP

(57) ABSTRACT

Provided are techniques for drawing mapping lines between source and target objects. A main view is displayed that shows one or more source objects, one or more target objects, and zero or more mappings between the one or more source objects and the one or more target objects, wherein a mapping line represents each mapping. Input that modifies the main view is received. In response to receiving the input, the mapping lines are sorted with a mapping strategy, and the mapping lines are drawn based on the mapping strategy.

4 Claims, 7 Drawing Sheets

MAPPING FOR MAPPING SOURCE AND TARGET OBJECTS

BACKGROUND

1. Field

Embodiments of the invention relate to mapping source and target objects.

2. Description of the Related Art

Some conventional systems enable a user to map columns of one table to columns of another table (i.e., to form mappings between columns). A mapping may be described as a relationship between two objects. A mapping may be represented by a mapping line. A mapping line may be formed by one or more segments and may include a hub (e.g., a square drawn on a mapping line). It is possible for there to be a large number of mappings (e.g., in the hundreds) of columns. The mappings may be shown on a display screen of a computer monitor, for example, by illustrating the tables and their columns and drawing lines between mapped columns.

It is difficult to comprehend schema mappings when the mapping lines connecting objects are not straight. In some contexts, the mapping lines have hubs. A user may select a hub to select a mapping line (i.e., because it may be difficult to select a particular line when many are displayed) or to obtain information about a mapping line. In many systems, hubs are drawn so that they do not overlap each other. In this situation, conflicts may arise such that the mapping lines are not always drawn as straight lines between source and target objects.

Thus, when the mapping lines are drawn without regard to the relative positions of the source and target nodes, a few outlying mapping lines may interfere with the drawing of a sequence of parallel mapping lines, making the mapping display harder to comprehend.

FIG. 1 illustrates prior art mappings for which mapping lines are drawn in order from top to bottom on a source side. FIG. 1 illustrates a main view 100 that displays an overview in accordance with certain embodiments. The main view 100 includes three areas: a source area 110, a mapping area 120, and a target area 130. The source area 110 shows source schemas, while the target area 130 shows target schemas. The mapping area 120 shows mapping lines that include hubs (e.g., mapping line 122 with hub 124). In this example, the source and target schemas are positioned so that source table EMPLOYEE 112 is lined up with target table EMPLOYEE 132. The columns of tables 112, 132 are mapped (shown with mapping lines) in order from top to bottom according to the columns of the source table 112 (i.e., from FNAME, MINIT, . . . DNO), but some of the mapping lines are not straight because the outlying mapping lines between source table DEPT_LOCATIONS 114 and target table DEPARTMENT 134 have been drawn first, and the source table EMPLOYEE 112 to target table EMPLOYEE 132 mapping lines that would have been drawn in the space that the mapping lines for tables 114, 134 occupy are then drawn below them. This is done to avoid having hubs overlap.

FIG. 2 illustrates prior art scrolled mappings for which mapping lines are drawn in order from top to bottom on a source side. In FIG. 2, the main view 100 (FIG. 1) is illustrated, but with the source area 110 scrolled up a little. The outlying mapping lines for tables 114, 134 once again prevent the mappings from the source table EMPLOYEE 112 to the target table EMPLOYEE 132 to be drawn as straight lines.

Thus, there is a need in the art for improved mapping of source and target objects.

SUMMARY OF EMBODIMENTS OF THE INVENTION

Provided are a method, computer program product, and system for drawing mapping lines between source and target objects. A main view is displayed that shows one or more source objects, one or more target objects, and zero or more mappings between the one or more source objects and the one or more target objects, wherein a mapping line represents each mapping. Input that modifies the main view is received. In response to receiving the input, the mapping lines are sorted with a mapping strategy, and the mapping lines are drawn based on the mapping strategy.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Before drawing mapping lines for a main view, embodiments sort the mapping lines in accordance with a mapping strategy (e.g., according to the slope of each of the mapping lines). Then, embodiments draw the sorted mapping lines. Certain embodiments draw mapping lines that are more horizontal (relative to other mapping lines) before drawing mapping lines that are less horizontal (i.e., those that are more vertical).

Figure 1:
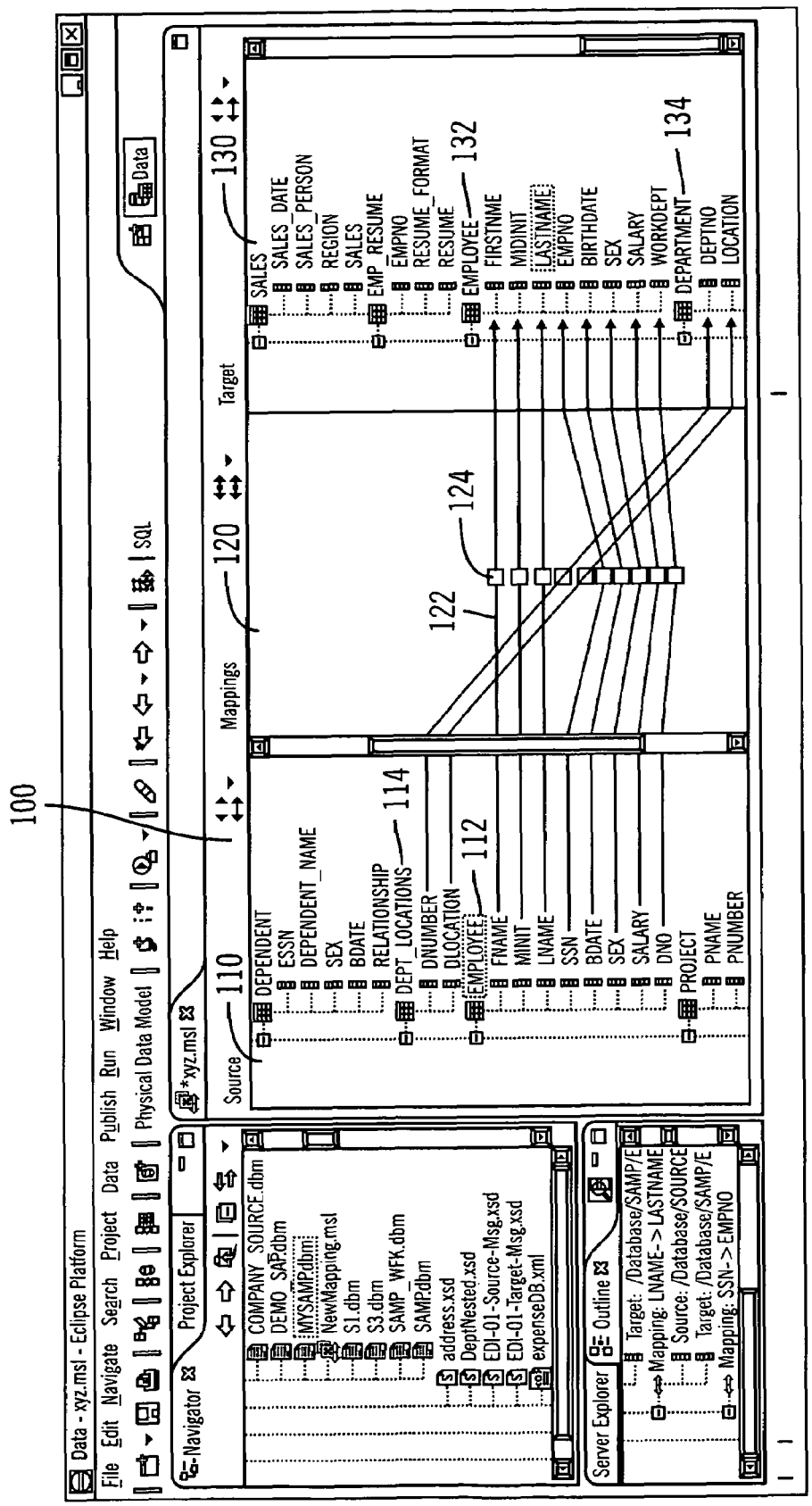
FIG. 1 illustrates prior art mappings for which mapping lines are drawn in order from top to bottom on a source side.
Figure 2:
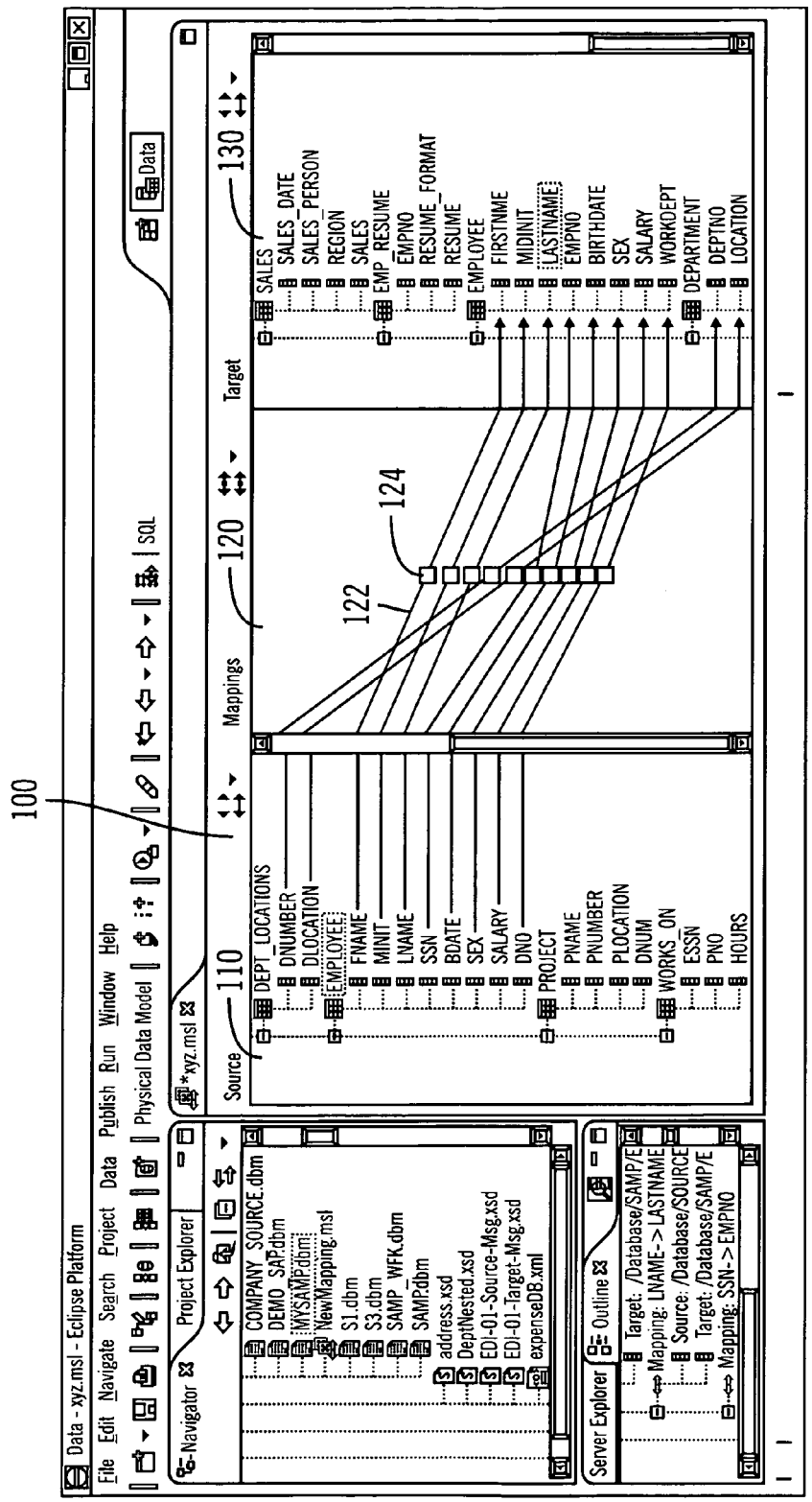
FIG. 2 illustrates prior art scrolled mappings for which mapping lines are drawn in order from top to bottom on a source side.
Figure 3:
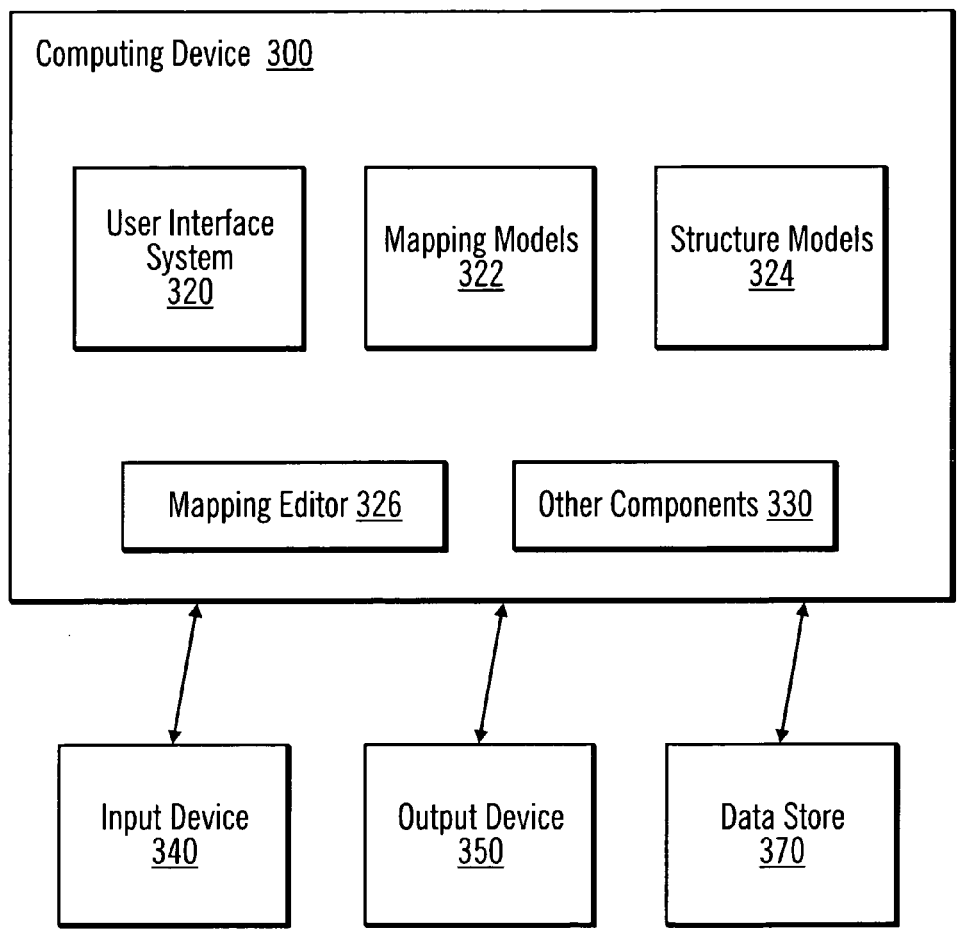
FIG. 3 illustrates details of a computer architecture in accordance with certain embodiments.

FIG. 3 illustrates details of a computer architecture in accordance with certain embodiments. A computing device 300 includes a user interface system 320, one or more mapping models 322, one or more structure models 324, and a mapping editor. The computing device 300 may also include other components 330. The user interface system 320 provides a Graphical User Interface (GUI) to enable a user to, for example, view and modify mappings between objects, to view mapped or unmapped objects, and to view nodes of structures.

The mapping model 322 may be described as including information on source objects and target objects and mappings between the source objects and target objects (e.g., information that indicates that a first column of a first table is mapped to a second column of a second table). Also, the mapping model 322 includes references to information in the structure models 324. The mappings that are stored in the mapping model 322 may be created in various manners. In certain embodiments, the user interface system 320 may be used to generate the mappings. The structure models 324 store structure information for the source and target objects. There may be one structure model 324 for source objects and another structure model 324 for target objects. The mapping editor 326 draws mapping lines between source and target objects.

The computing device 300 is coupled to an input device 340, an output device 350, and a data store 370. One or more mapping models may also be stored in the data store 370.

The mapping editor 326 uses the mapping models 322 and structure models 324 to draw mapping lines.

The computing device 300 may comprise any computing device known in the art, such as a server, mainframe, workstation, personal computer, hand held computer, laptop telephony device, network appliance, etc.

The data store 370 may comprise an array of storage devices, such as Direct Access Storage Devices (DASDs), Just a Bunch of Disks (JBOD), Redundant Array of Independent Disks (RAID), virtualization device, etc.

Examples herein may refer to tables and columns, but embodiments of the invention are applicable to various objects that may be mapped, such as nodes of structures. For example, a hierarchical structure is composed of nodes that are related to each other. The top-most node is called a root node, and the root node is the only node that has no parent. A node may have one or more child nodes, also referred to as children, and the node is said to be a parent of the child nodes. Nodes without child nodes are called leaf nodes. Ancestor nodes may be described as the nodes between a particular node and the root node. Descendant nodes of a particular node may be described as the nodes which have that particular node as an ancestor node. Embodiments may draw mapping lines between nodes of such hierarchical structures.

Figure 4:
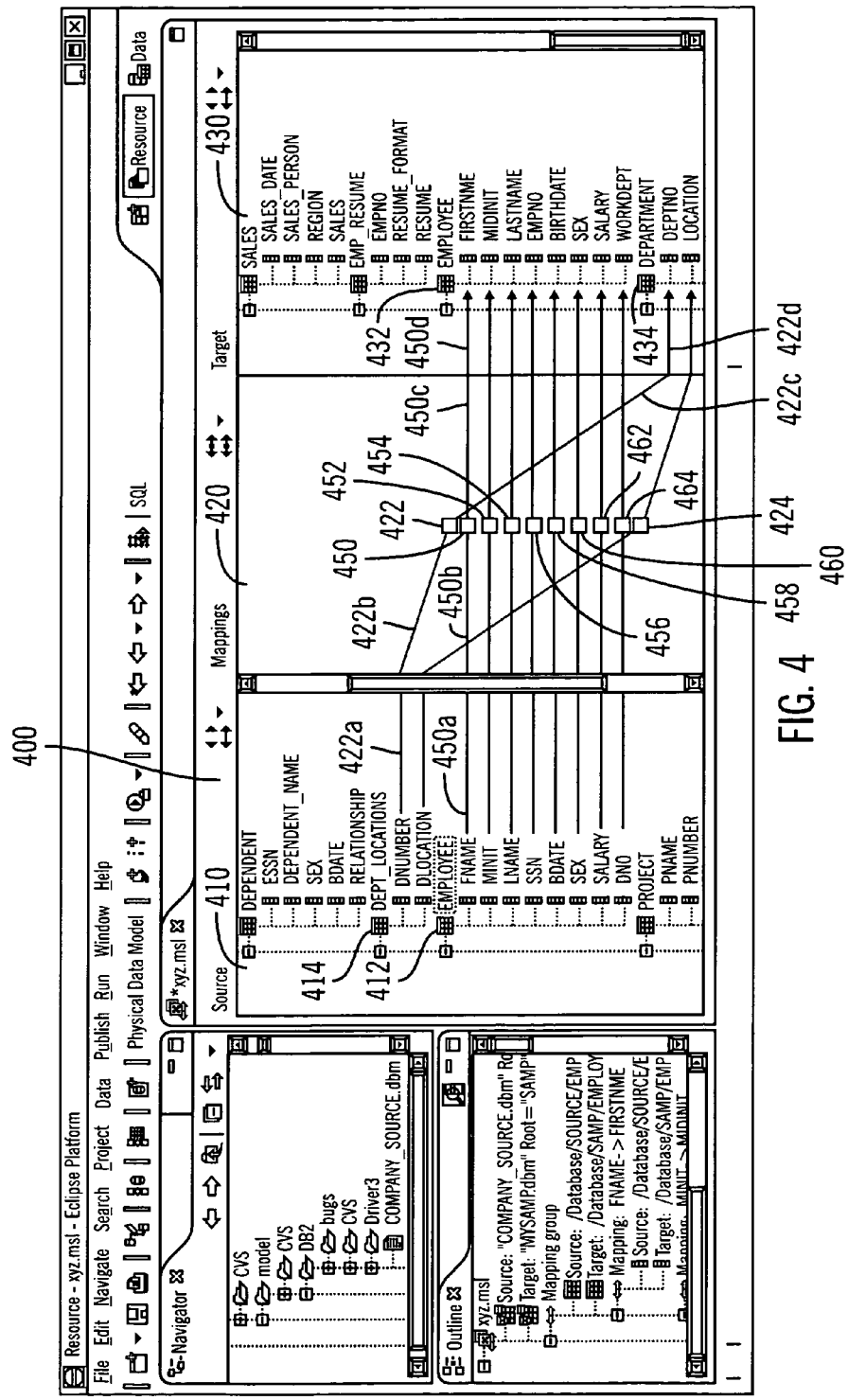
FIG. 4 illustrates mappings for which mapping lines are drawn after being sorted with a sorting strategy in accordance with certain embodiments.

FIG. 4 illustrates mappings for which mapping lines are drawn after being sorted with a sorting strategy in accordance with certain embodiments.

In certain embodiments, a main view 400 includes three areas: a source area 410, a mapping area 420, and a target area 430. In certain embodiments, each of the three areas 410, 420, 430 is independently scrollable (e.g., a user may use a separate scroll bar to scroll through portions of each area 410, 420, 430). In certain embodiments, the user interface system 320 uses the mapping model 322 to generate mappings shown in the main view and uses structure models 324 to generate structures shown in the source area 410 and target area 430.

In FIG. 4, a source table EMPLOYEE 412 is lined up with a target table EMPLOYEE 432. The mapping editor 326 determined a slope of each of the mapping lines to be drawn in the main view 400, sorted the mapping lines by slope, and drew the mapping lines in order from the mapping line with the smallest slope to the mapping line with the largest slope.

For example, in FIG. 4, a mapping line 450 includes a horizontal segment 450a from the source column FNAME in the source area 410 to the mapping area 420, a segment 450b on one side of the hub in the mapping area 420, a segment 450c on the other side of the hub in the mapping area 420, and a horizontal segment 450d from the mapping area 420 to the target column FIRSTNAME in the target area 430. For mapping line 450, the segments 450b, 450c within the mapping area 420 form a straight line. As another example, mapping line 422 includes a horizontal segment 422a from the source column DNUMBER in the source area 410 to the mapping area 420, a segment 422b on one side of the hub in the mapping area 420, a segment 422c on the other side of the hub in the mapping area 420, and a horizontal segment 422d from the mapping area 420 to the target column DEPTNO. For mapping line 422, the segments 422b, 422c within the mapping area 420 have different angles and different slopes (i.e., these segments 422b, 422c do not form a straight line).

Thus, the mapping lines 450-464 between the source table EMPLOYEE 412 and the target table EMPLOYEE 432 are more horizontal (relative to outlying mapping lines 422, 424) and are drawn straight within the mapping area 420. Additionally, the outlying mapping lines 422, 424 between a source table DEPT_LOCATIONS 414 and a target table DEPARTMENT 434 are more vertical (relative to mapping lines 450-464) within the mapping area 420.

Thus, with embodiments, the layout of mapping lines is simpler and easier to comprehend. For example, for source and target objects that may be nearly horizontally aligned (e.g., because the user scrolled the source and target areas so that these source and target object are nearly horizontally aligned), the mapping lines may be drawn more horizontally than other mapping lines. Also, the portions of the mapping lines within the source and target areas may be drawn horizontally for easier viewing.

Figure 5:
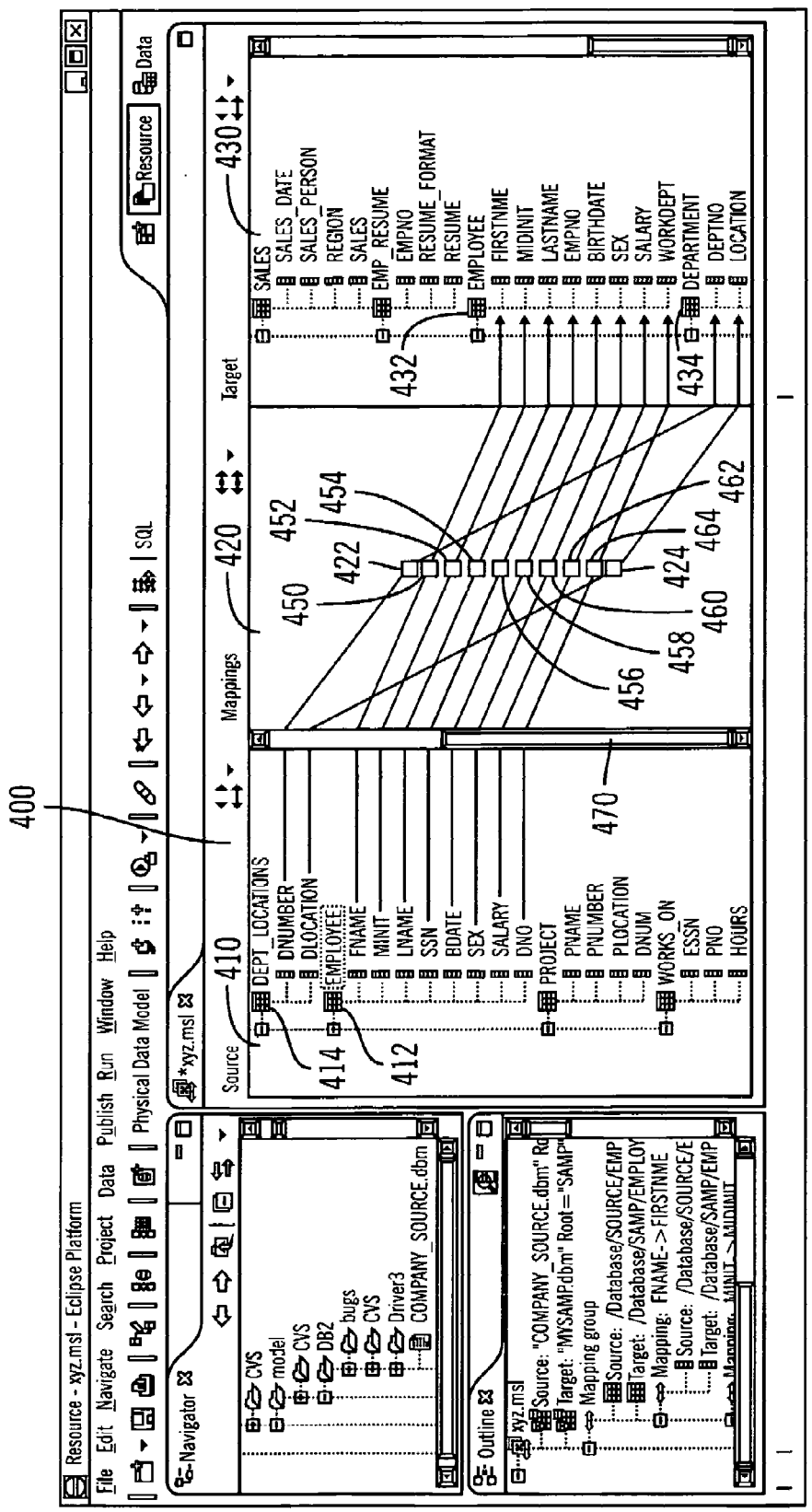
FIG. 5 illustrates scrolled mappings for which mapping lines are drawn after being sorted with a sorting strategy in accordance with certain embodiments.

FIG. 5 illustrates scrolled mappings for which mapping lines are drawn after being sorted with a sorting strategy in accordance with certain embodiments. In FIG. 5, the source area 410 in the main view 400 has been scrolled down using scroll bar 470. As in FIG. 4, the mapping lines 450-464 are straight lines, except for the two outlying mapping lines 422, 424. Again, with embodiments, the layout of mapping lines is simpler and easier to comprehend.

Figure 6:
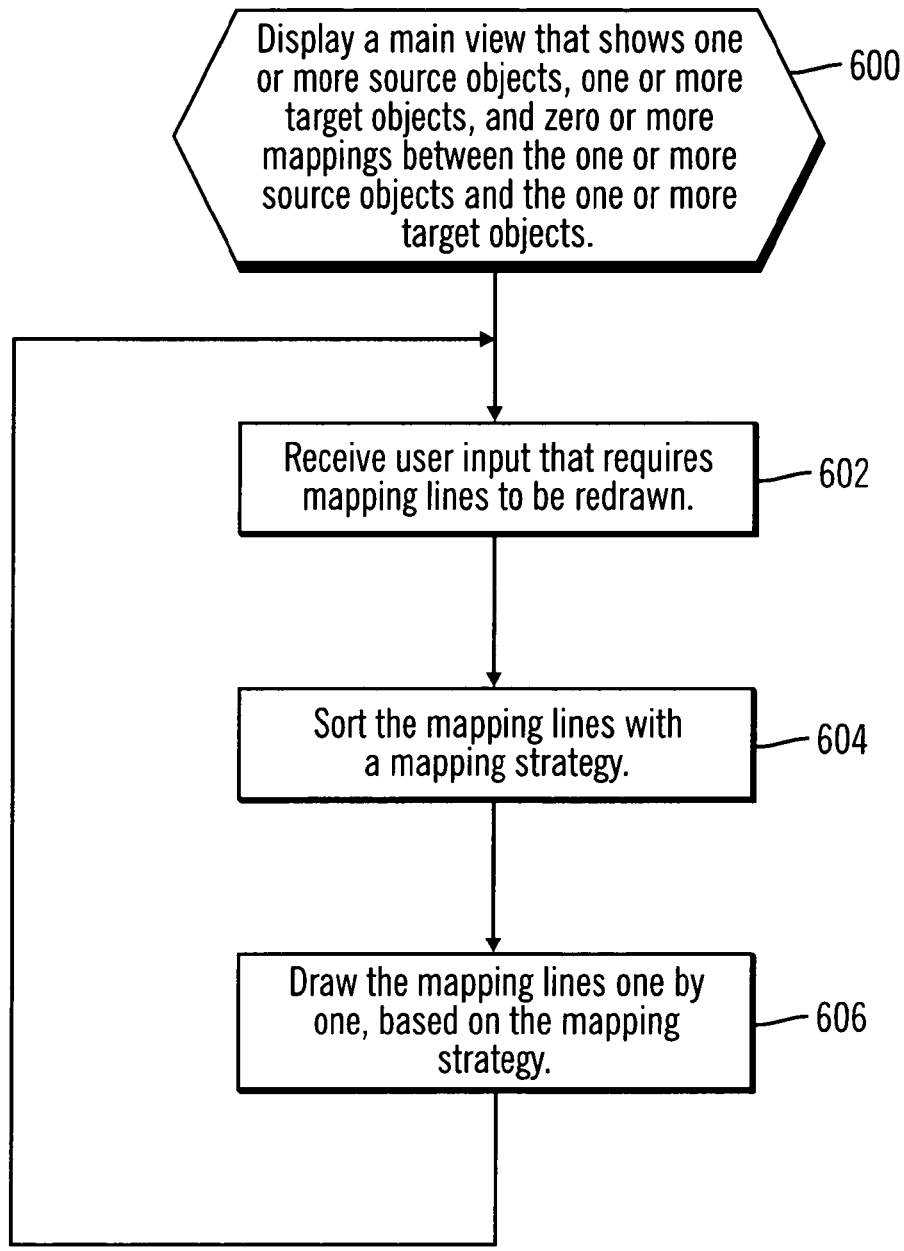
FIG. 6 illustrates logic performed by a mapping editor in accordance with certain embodiments.

FIG. 6 illustrates logic performed by the mapping editor 326 in accordance with certain embodiments. Control begins at block 600 with the mapping editor 326 displaying a main view that shows one or more source objects, one or more target objects, and zero or more mappings between the one or more source objects and the one or more target objects. In block 602, the mapping editor 326 receives user input that requires mapping lines to be redrawn. For example, the user may provide the input by selecting a source object and a target object and using a menu to create a mapping between the selected source and target objects. As another example, the user may scroll the source area or the target area, which would require existing mapping lines to be redrawn.

In block 604, the mapping editor 326 sorts the mapping lines with a mapping strategy. The mapping strategy describes how mapping lines are to be sorted and how the sorted mapping lines are to be drawn. For example, one mapping strategy may be to sort mapping lines based on the ordering of the source objects and to draw the mapping lines in this order, while another may be to sort mapping lines based on the ordering of target objects and to draw the mapping lines in this order. In certain embodiments, a user may select a mapping strategy. In certain embodiments, the mapping editor 326 implements a default mapping strategy.

In certain embodiments, the mapping strategy is to sort the mapping lines by slope. In such embodiments, the mapping editor 326 determines the slopes of each mapping line for the source and target mappings. In certain embodiments, the slope of a line may be defined by Equation (1), where $X1, Y1$ coordinates represent a location of a source object and $X2, Y2$ coordinates represent a location of a target object:

$$\frac{|Y1-Y2|}{|X1-X2|} \qquad \text{Equation (1)}$$

In Equation (1), the absolute value of the difference between the vertical coordinates (|Y1−Y2|) is divided by the absolute value of the difference between the horizontal coordinates (|X1−X2|).

In block 606, the mapping editor 326 draws the mapping lines based on how the mapping lines are sorted by the mapping strategy. The mapping strategy may indicate that sorting is to be done by slope and that mapping lines are to be drawn starting with the mapping line having the smallest slope. For example, if the mapping strategy is to use the slope of each mapping line, then the mapping editor 326 may draw the mapping lines one by one, starting with the mapping line with the smallest slope and ending with the mapping line with the largest slope. In certain embodiments, there may be multiple mapping lines with the same slope, and these mapping lines with the same slope may be drawn in an order specified by additional criteria (e.g., drawing lines that are closer to a top of a display screen of a computer monitor before drawing lines that are closer to a bottom of the display screen). From block 606, processing loops back to block 602.

Before each mapping line is drawn, the area in which the hub of the mapping line is to be drawn is checked to see whether another hub has already been drawn that uses any portion of that area. If so, the hub of the mapping line to be drawn is drawn in a different, unused area. In such a case, the mapping line from the source to the target may not be a single straight line. Thus, in certain embodiments a mapping line is formed by multiple, connected segments. In certain embodiments, the mapping editor 326 draws horizontal segments that form portions of a mapping line within the source and target areas, and the mapping editor 326 draws the portion of the mapping line within the mapping area based on the sorting. Within the mapping area, the mapping editor may draw segments of the mapping line with the same or different angles or slopes.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIG. 6 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIG. 6 may be implemented in software, hardware, programmable and non-programmable gate array logic or in some combination of hardware, software, or gate array logic.

Figure 7:
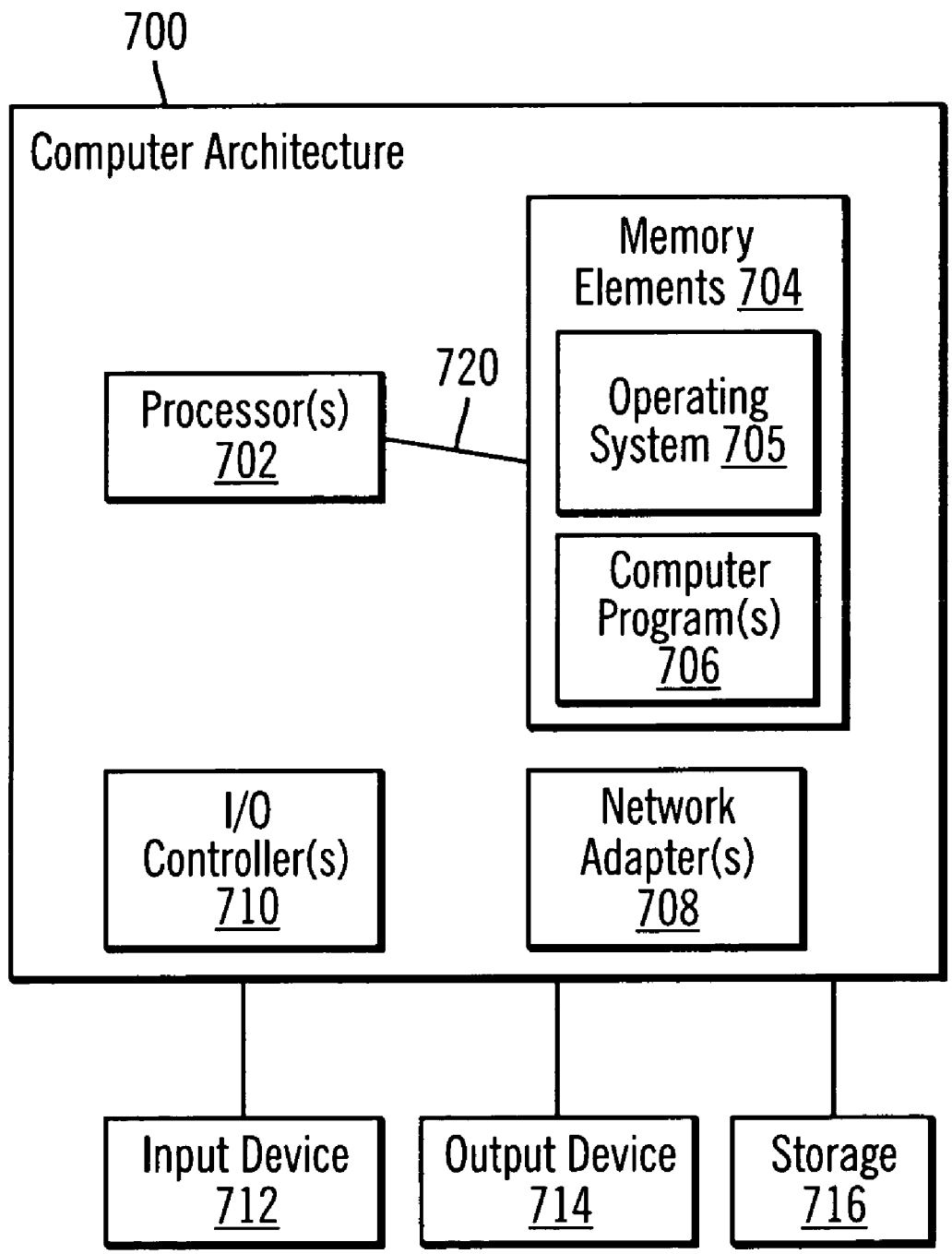
FIG. 7 illustrates an architecture of a computer system that may be used in accordance with certain embodiments.

FIG. 7 illustrates a system architecture 700 that may be used in accordance with certain embodiments. Computing device 300 may implement system architecture 700. The system architecture 700 is suitable for storing and/or executing program code and includes at least one processor 702 coupled directly or indirectly to memory elements 704 through a system bus 720. The memory elements 704 may include local memory employed during actual execution of the program code, bulk storage, and cache memories which provide temporary storage of at least some program code in order to reduce the number of times code must be retrieved from bulk storage during execution. The memory elements 704 include an operating system 705 and one or more computer programs 706.

Input/Output (I/O) devices 712, 714 (including but not limited to keyboards, displays, pointing devices, etc.) may be coupled to the system either directly or through intervening I/O controllers 710.

Network adapters 708 may also be coupled to the system to enable the data processing system to become coupled to other data processing systems or remote printers or storage devices through intervening private or public networks. Modems, cable modem and Ethernet cards are just a few of the currently available types of network adapters 708.

The system architecture 700 may be coupled to storage 716 (e.g., a non-volatile storage area, such as magnetic disk drives, optical disk drives, a tape drive, etc.). The storage 716 may comprise an internal storage device or an attached or network accessible storage. Computer programs 706 in storage 716 may be loaded into the memory elements 704 and executed by a processor 702 in a manner known in the art.

The system architecture 700 may include fewer components than illustrated, additional components not illustrated herein, or some combination of the components illustrated and additional components. The system architecture 700 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for drawing mapping lines between source and target objects, comprising:
    displaying a main view that shows one or more source objects, one or more target objects, and mappings between the one or more source objects and the one or more target objects, wherein a mapping line represents each mapping;
    receiving input that modifies the main view; and
    in response to receiving the input,
        determining the slope of each mapping line to be drawn between a source object and a target object, wherein the slope is determined in accordance with:

$$\frac{Y1-Y2}{X1-X2},$$

wherein where X1 and Y1 coordinates represent a location of the source object and X2 and Y2 coordinates represent a location of the target object;
    sorting the mapping lines with a mapping strategy using the slope of the mapping lines to sort; and
    drawing the mapping lines based on the mapping strategy by drawing each mapping line according to the slope of that mapping line wherein each mapping line that has a smaller slope than each of the other mapping lines is drawn before the other mapping lines.

2. The method of claim 1, wherein the input comprises a new mapping between the one or more source objects and the one or more target objects.

3. The method of claim 1, wherein the input comprises scrolling of at least one of a source area, a mapping area, and a target area.

4. The method of claim 1, further comprising: receiving the mapping strategy by user input.

* * * * *

UNITED STATES PATENT AND TRADEMARK OFFICE
CERTIFICATE OF CORRECTION

PATENT NO. : 7,499,943 B2  Page 1 of 1
APPLICATION NO. : 11/328798
DATED : March 3, 2009
INVENTOR(S) : Robert LaVerne Hobbs It is certified that error appears in the above-identified patent and that said Letters Patent is hereby corrected as shown below:

Col. 8, Line 19, delete "Y1-Y2" and replace with --|Y1-Y2|--.
Col. 8, Line 21, delete "X1-X2" and replace with --|X1-X2|--.

Signed and Sealed this

Twenty-eighth Day of September, 2010

David J. Kappos
*Director of the United States Patent and Trademark Office*